(12) United States Patent
Miller et al.

(10) Patent No.: US 8,339,413 B2
(45) Date of Patent: Dec. 25, 2012

(54) MULTIPLIED OCCLUDING TRANSPARENCY GRAPHICS PROCESSING

(75) Inventors: Gavin S. P. Miller, Los Altos, CA (US); Nathan A. Carr, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1331 days.

(21) Appl. No.: 11/749,868

(22) Filed: May 17, 2007

(65) Prior Publication Data
US 2011/0267363 A1    Nov. 3, 2011

(51) Int. Cl.
G09G 5/02    (2006.01)

(52) U.S. Cl. ........................................ 345/592; 345/611

(58) Field of Classification Search ................... 345/592, 345/421
See application file for complete search history.

(56) References Cited

U.S. PATENT DOCUMENTS

| | | | | |
|---|---|---|---|---|
| 6,128,000 | A | * | 10/2000 | Jouppi et al. .................. 345/614 |
| 6,967,663 | B1 | | 11/2005 | Bastos et al. |
| 2005/0225670 | A1 | * | 10/2005 | Wexler et al. ................ 348/441 |

OTHER PUBLICATIONS

Amor, M., M. Boo, E. J. Padron, and D. Bartz. "Hardware Oriented Algorithms for Rendering Order-Independent Transparency." The Computer Journal 49.2 (Mar. 2006): 201-10.*

U.S. Appl. No. 11/272,209, filed Nov. 9, 2005.
"Transparency and Antialiasing Algorithms Implemented with the Virtual Pixel Maps Technique", Abraham Mammen. IEEE Computer Graphics & Applications. 9(4), pp. 43-55, 1989.
"Interactive Order-Independent Transparency". C. Everitt, NVIDIA Technical report, 2001.(http://developer.nvidia.com/object/Interactive_Order_Transparency.html).
"Near Real-Time CSG Rendering Using Tree Normalization and Geometric Pruning", Jack Goldfeather, Steven Molnar, Greg Turk, and Henry Fuchs, IEEE Computer Graphics and Applications, vol. 9, Issue 3 (May 1989), pp. 20-28.
U.S. Appl. No. 11/749,870, filed May 17, 2007.

* cited by examiner

*Primary Examiner* — Xiao M. Wu
*Assistant Examiner* — Scott E Sonners
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for rendering an artwork comprising a plurality of surfaces, wherein the plurality of surfaces comprises a plurality of semi-transparent surfaces. Each of the semi-transparent surfaces may be rendered to a first image buffer at a multi-sampled resolution. Each of the rendered semi-transparent surfaces at the multi-sampled resolution may be multiplied by one or more transparency values of one or more of the plurality of surfaces nearer than the rendered semi-transparent surface. Each of the rendered and attenuated semi-transparent surfaces may be reduced from the multi-sampled resolution to a display resolution and added at the display resolution to a second image buffer.

21 Claims, 9 Drawing Sheets

810 Multi-Sample Configuration
(*C* samples in 1 cluster)

820 Multi-Sample Configuration
(*C*/4 samples in 4 clusters)

830 Multi-Sample Configuration
(*C*/16 samples in 16 clusters)

MULTIPLIED OCCLUDING TRANSPARENCY GRAPHICS PROCESSING

BACKGROUND

1. Field of the Invention

The present invention is directed to computer systems; and more particularly, it is directed to rendering artwork including semi-transparent surfaces using computer systems.

2. Description of the Related Art

As the power and complexity of personal computer systems increase, graphics operations and graphical data are likewise increasing in complexity. For example, an instance of three-dimensional (3-D) artwork may include numerous layers of graphical data. The layers may be related in complex ways based on their relative depth as well as their transparency properties. The layers may also be referred to as surfaces. It is desirable to render artwork containing such layers (e.g., for display on a display device) both correctly and efficiently.

A typical problem encountered when rendering 3-D artwork is "hidden surface" removal, which involves finding the nearest surface at each pixel. Because the image is created using only the color of the nearest shaded surface at each pixel, hidden surface removal produces a realistic depiction of opaque objects.

One technique for rendering hidden surfaces involves sorting the triangles which make up the surface so that the nearest triangles are rendered last when rasterizing the triangles. This geometry sorting technique may be referred to as an "object space sort." Unfortunately, this technique may be inefficient for complex models containing intersecting surfaces, e.g., where the triangles that make up a surface are broken up into smaller pieces.

Another technique for hidden surface removal stores the depth value (Z-value) at each pixel sample. This technique may be referred to as an "image-based sort." The Z-value is initialized to a suitably far value, and the surfaces are then rasterized to compute the surface Z-value at each pixel. If the surface Z-value is smaller than the Z-value for the pixel sample, then the pixel color and pixel Z-value are replaced with the surface color and surface Z-value.

A "Z-buffer" technique is a method for rendering opaque surfaces in modern graphics hardware. The Z-buffer is part of an off-screen memory that stores the depth of each pixel or the distance (i.e., the Z-value) of each pixel from the viewpoint. When using the Z-buffer technique to render images, however, aliasing artifacts may result on edges of the geometry. Modern graphics hardware may address the aliasing problem in several ways. One technique involves rendering the image to an off-screen buffer that is larger than the final displayed image and then filtering down the result. Another technique involves rendering the image several times, slightly "jittering" the camera each time, and averaging the resulting images to reduce the aliasing artifacts. A solution referred to as "full-screen anti-aliasing" may use multiple color and Z-samples (i.e., sub-pixels) for each pixel.

A modern graphics processing unit (GPU) typically runs small programs called "pixel shaders" to compute the surface color and the alpha values for each pixel based on texture values. Pixel shaders may be relatively expensive to execute. One optimization used in full-screen anti-aliasing is to compute the pixel shader once per pixel then use the resulting color and the alpha value for each of the sub-pixels when performing Z-buffering. The Z-value may then be interpolated correctly for each sub-pixel from the geometry to allow for anti-aliased intersections to be rendered correctly.

A blending function referred to as "over" may be used in representing surfaces in 3-D scenes. A vertex or pixel in a surface may be described by an opaque color along with at least one transparency value. The surface transparency value may directly scale the amount of light coming through the surface, and one minus the transparency value may scale the opaque color before adding the result to the pixel. To simplify subsequent calculations, the surface color may be defined as the pre-multiplied surface color (i.e., the surface opaque color value) multiplied by one minus the surface transparency value. The formula for the over operator may be represented by the following equation (1), where the colors are for the pixel before and after compositing of the Nth surface:

$$C_{pixel}^{N} = C_{surface}^{N} + T_{surface}^{N} * C_{pixel}^{N-1} \qquad (1)$$

One technique to compute the final color arising from a stack of transparent surfaces is to sort them in order of depth value (Z-value) and then apply equation (1) from back to front. When the scene also includes opaque surfaces, the nearest opaque surface is first used to set the color of the pixel. Any transparent surfaces behind the nearest opaque surface are discarded since they are obscured by the opaque surface. This technique is referred to as "back-to-front compositing."

Another technique is to operate on the surfaces in front to back order. In addition to the pixel color, a transparency value is kept at each pixel sample. This pixel transparency is initially set to one. For subsequent surfaces, the values of the pixel sample transparency and pixel sample color are modified using equations (2) and (3):

$$C_{pixel}^{N} = T_{pixel}^{N-1} C_{surface}^{N} + C_{pixel}^{N-1} \qquad (2)$$

$$T_{pixel}^{N} = T_{pixel}^{N-1} T_{surface}^{N} \qquad (3)$$

To avoid sorting the surfaces before rendering, a technique referred to as "layer peeling" may be used during rasterization. Layer peeling may render the geometry multiple times using two Z-buffers to compute the nearest surface, the next nearest surface, and so on. A drawback of the layer peeling technique is the need for a second Z-buffer. On modern graphics hardware, a depth texture can be used to store the depth value (Z-value) of the Z-buffer. Originally designed for Z-buffered shadows, the depth texture test allows one sample per pixel and returns the result of testing a depth value against the contents of a pixel. However, given the sample constraint on depth textures, layer peeling is currently incompatible with full-screen anti-aliasing.

SUMMARY

Various embodiments of systems, methods, and computer-readable storage media for rendering artwork including semi-transparent surfaces are disclosed. A three-dimensional computer graphics artwork may comprise a plurality of surfaces including a plurality of semi-transparent surfaces and optionally one or more opaque surfaces. The semi-transparent surfaces may be unsorted relative to their depth order prior to rendering. According to one embodiment, each of the semi-transparent surfaces may be rendered to a first image buffer at a multi-sampled resolution. Each of the rendered semi-transparent surfaces at the multi-sampled resolution may be multiplied (e.g., attenuated) by one or more transparency values of one or more of the plurality of surfaces nearer than the rendered semi-transparent surface. Each of the rendered and attenuated semi-transparent surfaces may be reduced from the multi-sampled resolution to a display resolution and added at the display resolution to a second image buffer. In this manner, the semi-transparent surfaces in the artwork may be processed iteratively, with two passes through the artwork geometry for each semi-transparent surface, until the second image buffer contains final image data for display.

According to one embodiment, each color channel (e.g., each of the red, blue, and green values for a pixel) in any of the semi-transparent surfaces may have a different transparency value. According to one embodiment, reducing the rendered semi-transparent surface from the multi-sampled resolution to the display resolution may comprise generating each pixel at the display resolution by averaging color values of a set of corresponding pixels (e.g., the multi-samples or sub-pixels) at the multi-sampled resolution. Any opaque surfaces in the artwork may be rendered prior to rendering the semi-transparent surfaces.

Figure 1:
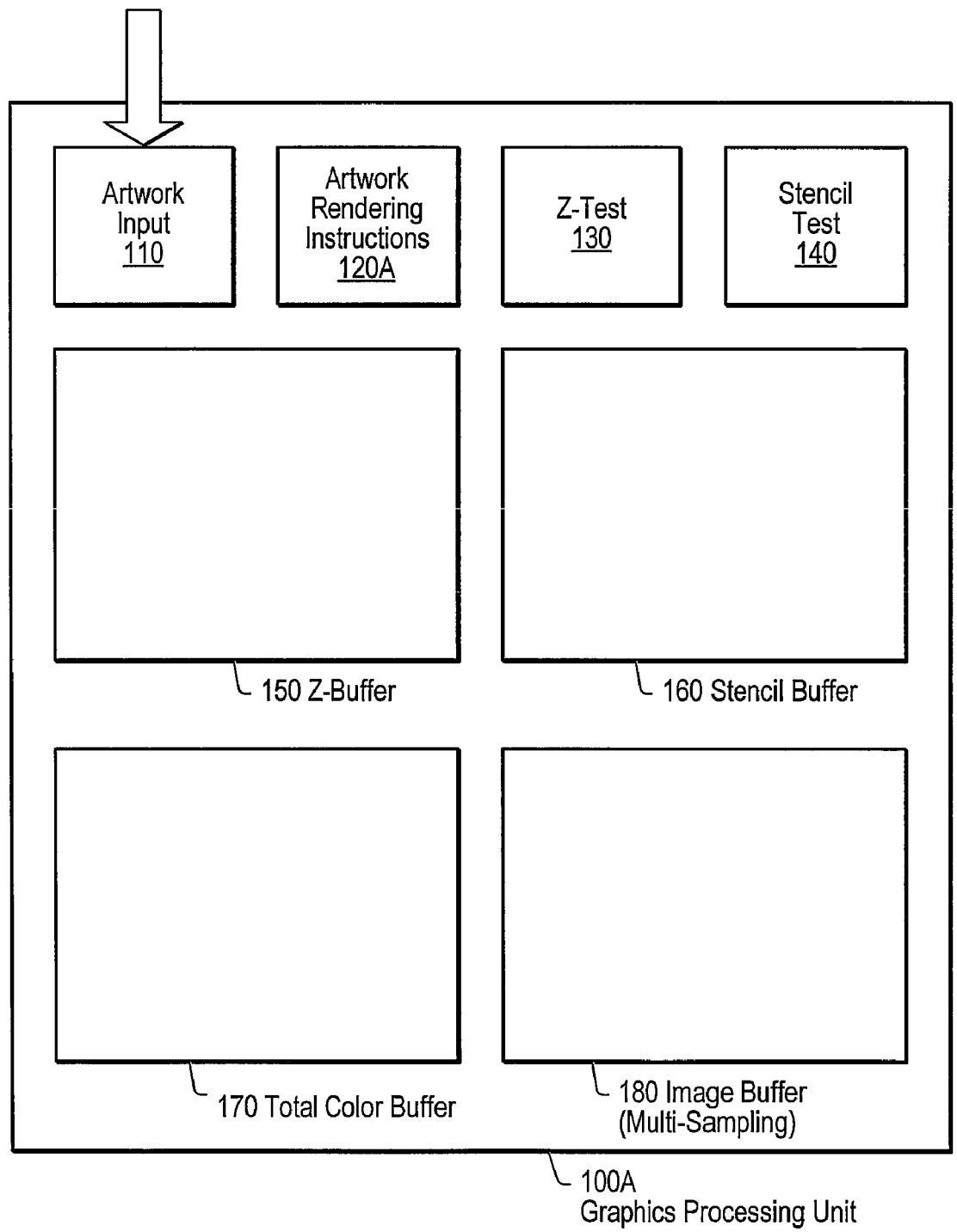
FIG. 1 is a block diagram illustrating one embodiment of a graphics processing unit (GPU) configured for rendering artwork including semi-transparent surfaces using an image buffer at display resolution.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Using embodiments of the systems and methods described herein, an instance of computer graphics artwork (referred to herein as "an artwork") comprising a plurality of semi-transparent surfaces may be rendered in an efficient and depth-order-independent manner. The correct rendering of semi-transparent surfaces may be performed without the need for a second Z-buffer and the associated overhead of copying values between two Z-buffers. In some embodiments, the full-screen anti-aliasing mechanism of modern graphics hardware may be used. In some embodiments, multi-sampling hardware may be used to represent a plurality of surfaces in the same image buffer during one pass through the artwork geometry.

Figure 9:
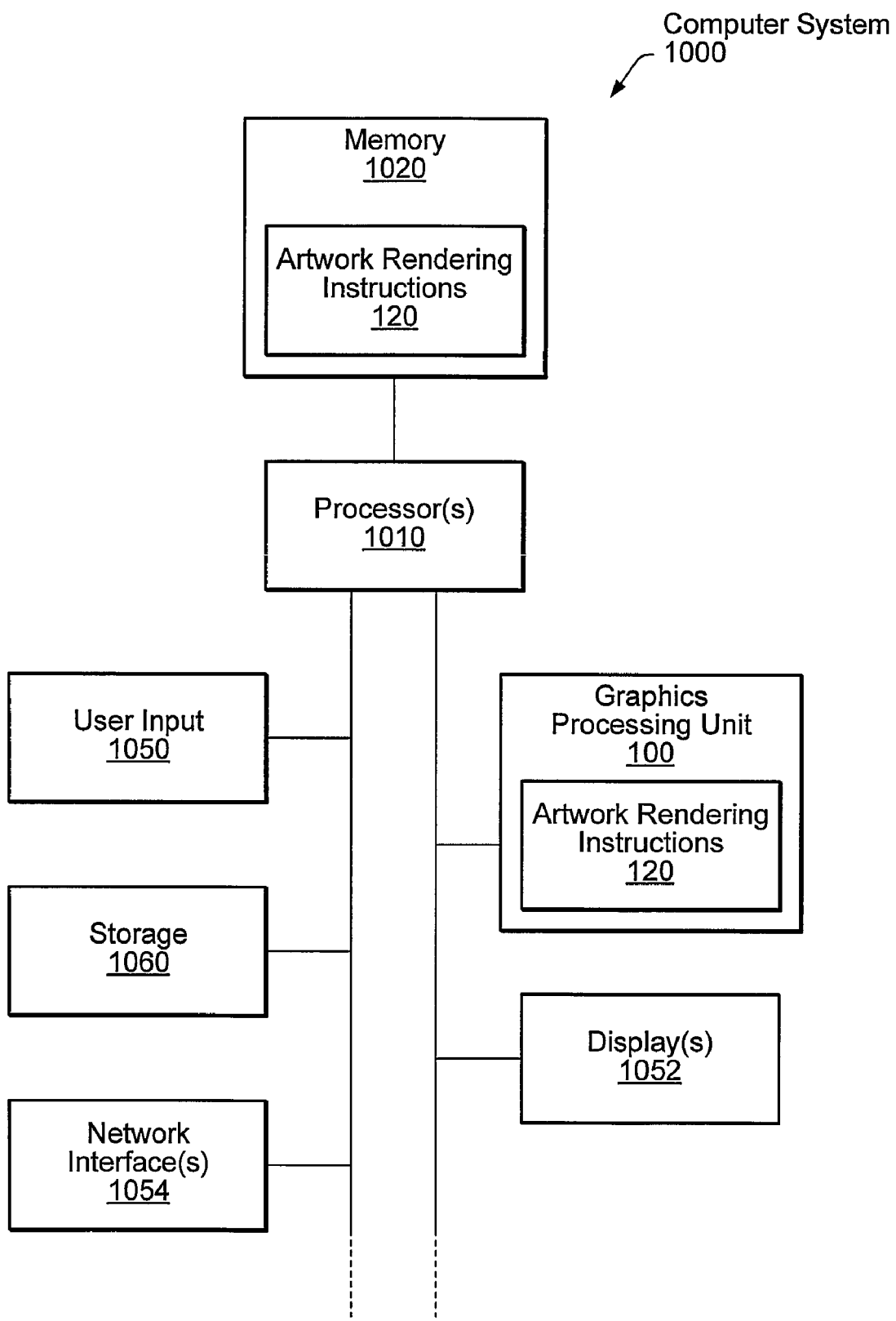
FIG. 9 is a block diagram illustrating constituent elements of a computer system that is configured to implement embodiments of the system and method for rendering artwork including semi-transparent surfaces.

In one embodiment, a graphics processing unit (GPU) may be used to perform aspects of artwork rendering operations. FIG. 1 is a block diagram illustrating one embodiment of a GPU 100A configured for rendering artwork including semi-transparent surfaces using an image buffer at display resolution. A GPU, also referred to herein as a graphics processor, may comprise a dedicated graphics rendering device associated with a computer system. An example of a suitable computer system 1000 for use with a GPU is illustrated in FIG. 9. Turning back to FIG. 1, the GPU 100A may include numerous specialized components configured to optimize the speed of rendering graphical data to produce graphics output. For example, the GPU 100A may include specialized components for rendering three-dimensional structures, for applying textures to surfaces, etc. For the sake of illustration, however, only a limited selection of components is shown in the example GPU 100A of FIG. 1. It is contemplated that GPU architectures other than the example architecture of FIG. 1 may be suitable for implementing the techniques described herein. Suitable GPUs may be commercially available from vendors such as NVIDIA Corporation, ATI Technologies, and others.

A GPU may be used in a removable graphics card that is coupled to a motherboard via a standardized bus (e.g., AGP or PCI Express). A GPU may also be used in an integrated graphics solution (e.g., for use in some portable computers and lower-cost desktop computers). The GPU may include a host interface configured to communicate with elements of a host computer system 1000 (e.g., a communications bus and/or processor(s) 1010 of a host computer system 1000). For example, the host computer system 1000 may provide input data (e.g., artwork input 110) and/or executable program code (e.g., artwork rendering instructions 120A) to the GPU 100. In some embodiments, the host interface may permit the movement of data in both directions between the GPU 100 and the host computer system 1000. In one embodiment, the GPU 100 may be configured to access memory 1020 of the host computer system 1000 via the host interface. The GPU 100 may also include a display interface configured to provide output data to one or more display devices 1052. The GPU 100 may "drive" a display 1052 by providing graphics output at a particular rate from a frame buffer. The GPU 100 may implement one or more application programmer interfaces (APIs) that permit programmers to invoke the functionality of the GPU.

In one embodiment, the GPU 100 may include internal memory. The GPU memory, also referred to herein as "video memory" or "VRAM," may comprise random-access memory (RAM) which is accessible to other GPU components. As will be described in greater detail below, the GPU memory may be used in various embodiments to store various types of data and instructions such as input data, output data, intermediate data, program instructions for performing various tasks, etc. As illustrated in FIG. 1, he GPU memory may comprise one or more buffers such as a Z-buffer (i.e., depth buffer) 150, a stencil buffer 160, and various image buffers such as a multi-sampling image buffer 180 and a total color buffer 170. Each buffer may comprise a two-dimensional array of pixel data (e.g., color values) or pixel metadata (e.g., depth values). The use of the individual buffers in the rendering of artwork including a plurality of semi-transparent surfaces is described in greater detail below.

The GPU 100A may also include various built-in functions to assist in the rendering of artwork. In one embodiment, the GPU 100A may include a Z-test (i.e., depth test) function 130 operable to perform comparisons of Z-values (i.e., depth values in the Z-buffer 150) and take action accordingly (e.g., keep or discard pixels). In one embodiment, the GPU 100A may include a stencil test function 140 operable to perform comparisons of stencil values (e.g., in the stencil buffer 160) and take action accordingly (e.g., keep or discard pixels). The Z-test 130 and stencil test 140 may be enabled, disabled, and/or otherwise configured through invocation of appropriate functions in the GPU API and/or by operation of the artwork rendering instructions 120A. As will be described in greater detail below, the Z-test 130 and stencil test 140 may be used in the rendering of artwork including a plurality of semi-transparent surfaces.

Figure 2A:
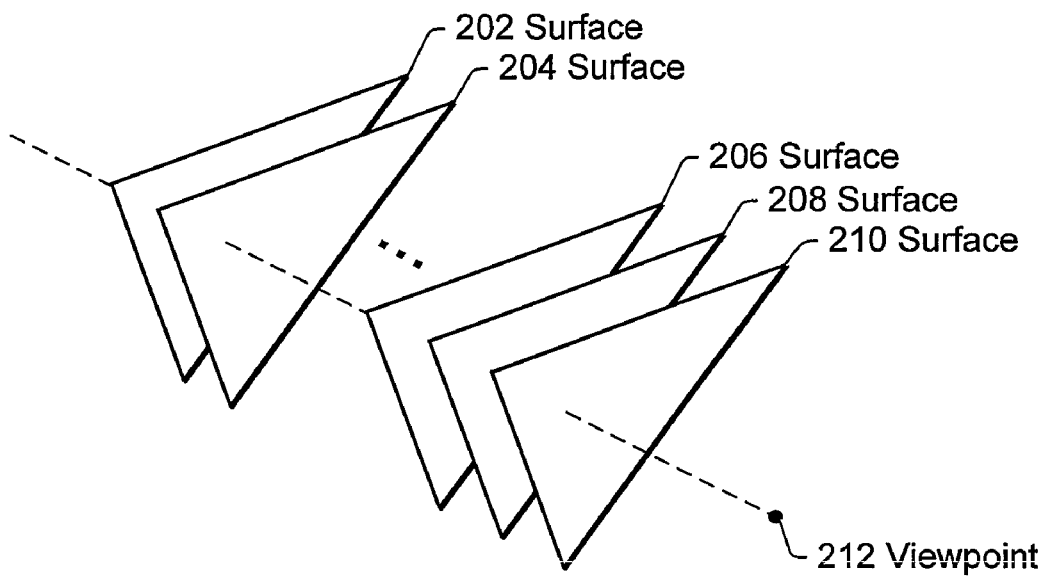
FIG. 2A is a diagram illustrating a depth order of semi-transparent surfaces in an artwork that is configured to be rendered using embodiments of the systems and methods described herein.

FIG. 2A is a diagram illustrating a depth order of semi-transparent surfaces in an artwork that is configured to be rendered using embodiments of the systems and methods described herein. In contrast to opaque surfaces that completely obscure surfaces behind them, each of the semi-transparent surfaces 202, 204, 206, 208, and 210 may partially block the color of individual pixels in surfaces further away from a viewpoint 212. As used herein, "semi-transparent" and "transparent" are used synonymously. The shapes and positions of the semi-transparent surfaces 202, 204, 206, 208, and 210 may vary from the example shown in FIG. 2A. The example semi-transparent surfaces 202, 204, 206, 208, and 210 are illustrated in a depth order reflecting their relative distance from the viewpoint 212. In the example shown in FIG. 2A, surface 202 is the furthest surface, and surface 210 is the nearest surface. When determining the color for a given pixel in the frame, the contribution to the final color value by a given semi-transparent surface is a function of the color value for the given surface attenuated by the transparency of each surface in front of the given surface.

In one embodiment, the surfaces may be stored as geometric objects using a 3-D graphics model, and the geometric objects may be rasterized to pixels during a rendering process. In one embodiment, the transparency properties of a surface may be indicated by one or more alpha values for vertices or pixels in the surface. The alpha value(s) may be stored in one or more alpha channels along with one or more color channels (e.g., representing red, green, and blue values) for each vertex or pixel. In one embodiment, the semi-transparent surfaces may be implemented using a general transparency model in which the foreground and the background alpha and color values are combined using a blending function (also referred to as a compositing operator). As used herein, the terms "surfaces" and "layers" are used synonymously.

Figure 2B:
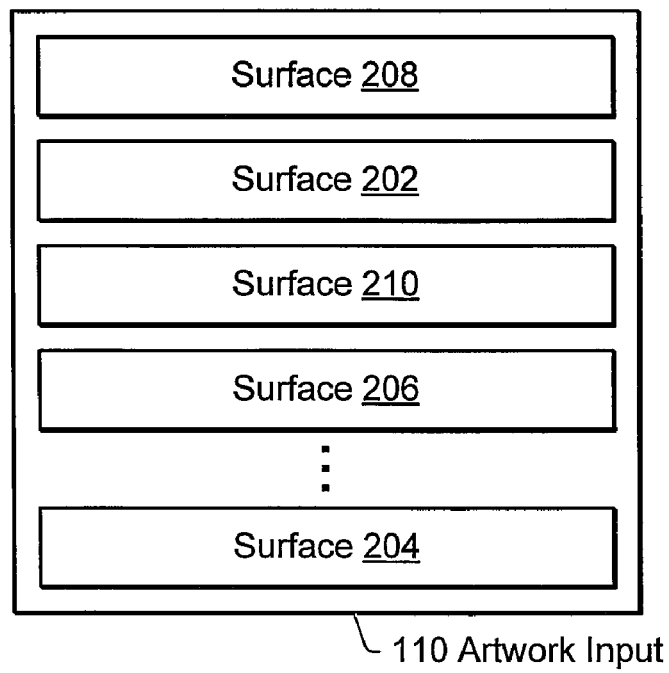
FIG. 2B is a diagram illustrating a draw order of semi-transparent surfaces in an artwork that is configured to be rendered using embodiments of the systems and methods described herein.

FIG. 2B is a diagram illustrating a draw order of semi-transparent surfaces in an artwork that is configured to be rendered using embodiments of the systems and methods described herein. In one embodiment, the GPU 100A may be configured to render surfaces in draw order, i.e., the order in which the surfaces are received at the GPU 100A. When provided as artwork input 110 to a GPU, the semi-transparent surfaces 202, 204, 206, 208, and 210 may be provided in an order that is not the same as the depth order illustrated in FIG. 2A. An example draw order is illustrated in FIG. 2B. By rendering artwork comprising a plurality of semi-transparent surfaces in substantially any draw order, the systems and methods described herein may be order-independent.

Vertices or pixels in the semi-transparent surfaces 202, 204, 206, 208, and 210 may have associated Z-values (i.e., depth values) indicating relative depth or distance from the viewpoint 212. In one embodiment, the Z-values referred to as "Z-far" and "Z-near" may be used to ensure that the depth values stored in the Z-buffer 150 are of a known finite range. In one embodiment, a more accurate Z-test 130 may be performed for a given precision of Z-buffer values when Z-far and Z-near values tightly bracket the actual geometry.

Figure 3:
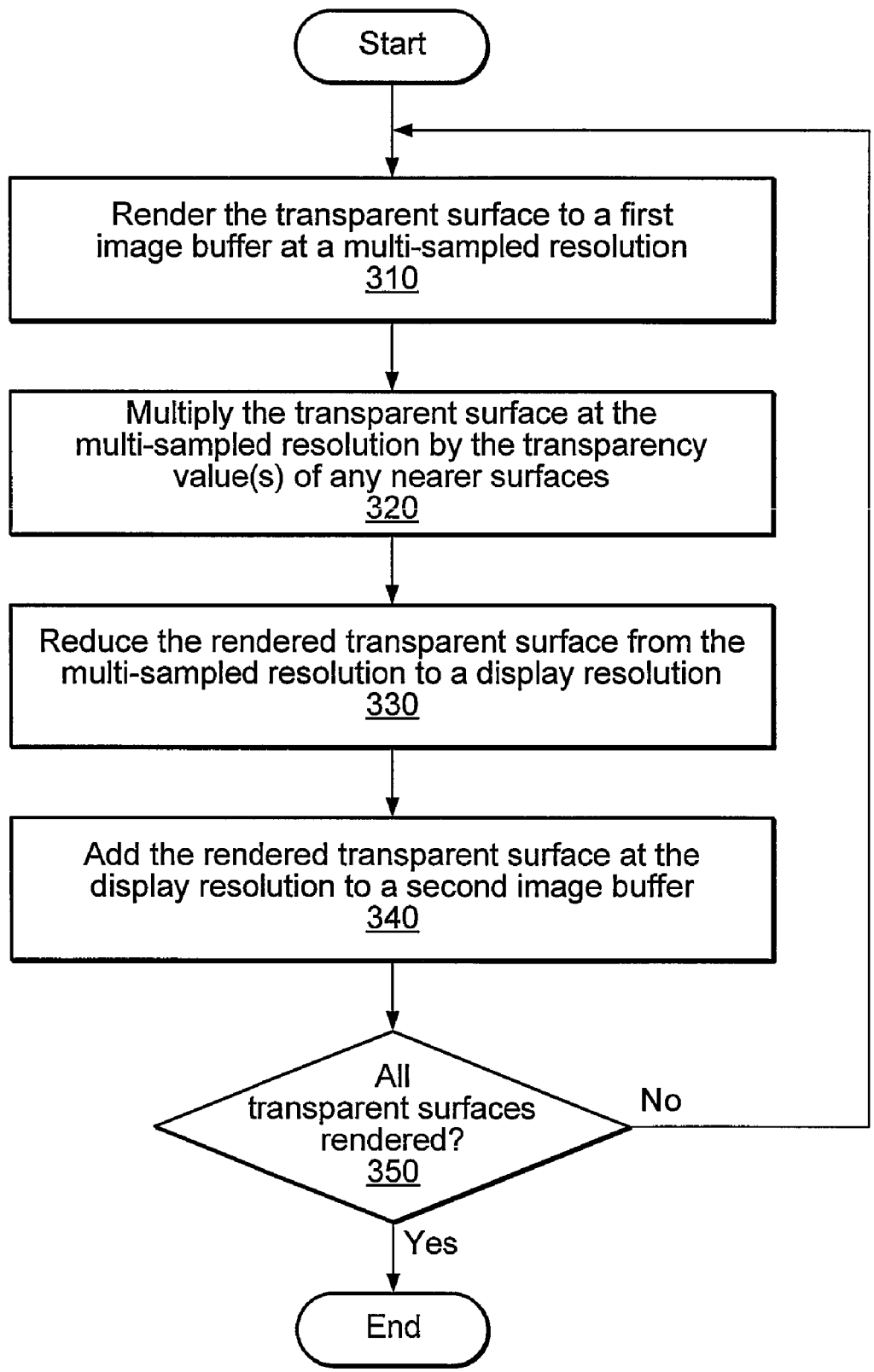
FIG. 3 is a flow diagram illustrating a method for rendering artwork including semi-transparent surfaces using an image buffer at display resolution according to one embodiment.
Figure 4:
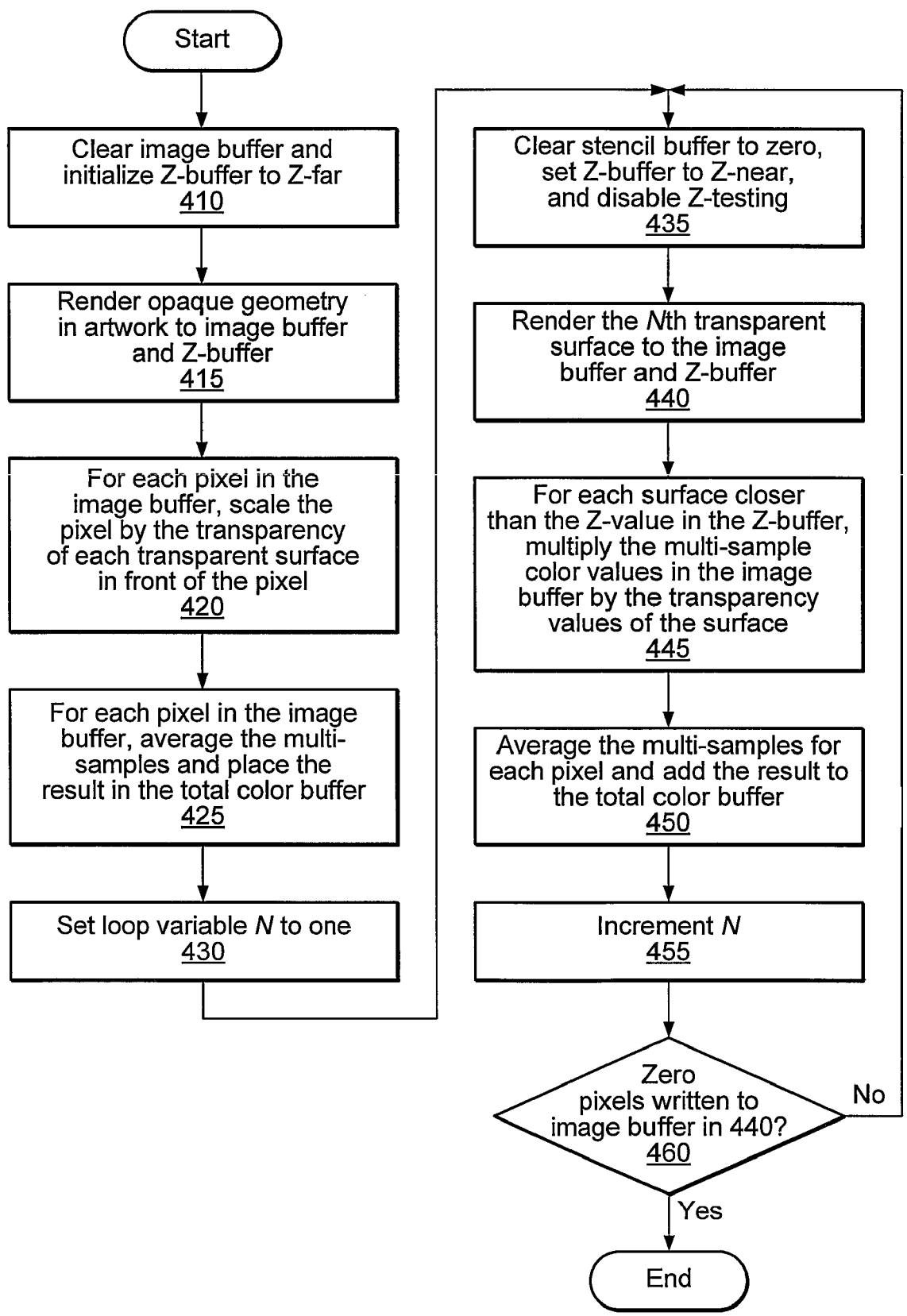
FIG. 4 is a flow diagram illustrating a method for rendering artwork including semi-transparent surfaces using an image buffer at display resolution according to one embodiment.

The rendering techniques shown in FIGS. 3 and 4 may be referred to as Multiplied Occluding Transparency (MOT) techniques. The techniques shown in FIGS. 3 and 4 may use two passes through the semi-transparent geometry in the artwork. FIG. 3 is a flow diagram illustrating a method for rendering artwork including semi-transparent surfaces using an image buffer at display resolution according to one embodiment. Blocks 310 through 340 may be performed for each of a plurality of semi-transparent surfaces in an artwork. The semi-transparent surfaces may be unsorted and processed in draw order. Opaque surfaces in the artwork, if any, may be processed beforehand as described with reference to FIG. 4.

As shown in block 310, the semi-transparent surface may be rendered to a first image buffer 180 at a multi-sampled resolution. A full-screen anti-aliasing mechanism of the GPU 100A may be used to implement the multi-sampled image buffer 180 at a higher resolution than the final display resolution. The multi-sampled image buffer 180 may be allocated to have a greater resolution (e.g., twice the horizontal resolution and twice the vertical resolution) as the display resolution. The multi-sampled image buffer 180 may comprise a fixed multiple (e.g., four, eight, sixteen, etc.) of pixel values (e.g., color values and alpha values) for each destination pixel in the artwork. The multiples may be referred to as multi-samples or sub-pixels. Rendering the surface may comprise rasterizing one or more objects and/or executing a pixel shader and/or vertex shader to generate the multi-samples. As shown in block 320, the rendered semi-transparent surface at the multi-sampled resolution may be multiplied by one or more transparency values of one or more of the plurality of surfaces (if any) nearer than the rendered semi-transparent surface. In other words, the surface color of each pixel in the rendered semi-transparent surface may be attenuated by the product of the transparency values of the occluding surfaces (if any). In one embodiment, the operations performed in blocks 310 and 320 may be represented by equation (4), where the transparency values $T_{surface}$ are for the N surfaces in front of surface i:

$$C_i = T_{surface}^N T_{surface}^{N-2} T_{surface}^{N-3} \ldots T_{surface}^1 C_{surface}^i \qquad (4)$$

As shown in block 330, the rendered semi-transparent surface may be reduced in size (e.g., resolution) from the multi-sampled resolution may be reduced to a display resolution. In one embodiment, reducing the rendered semi-transparent surface from the multi-sampled resolution to the display resolution may comprise generating each pixel at the display resolution by averaging color values of a set of corresponding pixels (e.g., the multi-samples or sub-pixels) at the multi-sampled resolution. As shown in block 340, the rendered semi-transparent surface may be added to (i.e., stored in) a second image buffer 170 at the display resolution. The second image buffer may be referred to as a total color buffer 170. In one embodiment, the operations shown in blocks 330 and 340 may be performed substantially simultaneously. As shown in block 350, the method may continue at block 310 for the next semi-transparent surface in draw order until all of the semi-transparent surfaces have been processed. After processing all the surfaces in the artwork, the total color buffer 170 may be used to generate the final output for display. Each final pixel value may be represented by equation (5):

$$C_{pixel} = \Sigma_i C_i \qquad (5)$$

The multiplication in (4) and the summation in (5) may be done in any order due to the commutative property of multiplication and the commutative property of addition. Therefore, the surfaces may be rendered in arbitrary order (e.g., not the depth order), provided that each surface color is scaled using (4) and then combined into the total color buffer using (5).

FIG. 4 is a flow diagram illustrating further aspects of a method for rendering artwork including semi-transparent surfaces using an image buffer at display resolution according to one embodiment. As shown in block 410, the image buffer 180 may be cleared, and the Z-buffer may be initialized so that all values are Z-far. As shown in block 415, any opaque surfaces in the artwork may be rendered to the image buffer 180 (e.g., by adding the color values to the appropriate multi-samples in the image buffer 180) and the Z-buffer 150 (e.g., by writing the depth values in the Z-buffer 150 for the corresponding pixels stored in the image buffer 180). As shown in block 420, each pixel in the image buffer 180 may be scaled by the transparency of each transparent surface (if any) nearer than the pixel. As shown in block 425, each pixel in the image buffer 180 may be added to the total color buffer 170 by averaging the corresponding multi-samples.

After processing the opaque surfaces as shown in blocks 415, 420, and 425, the semi-transparent surfaces may then be processed in draw order. As shown in block 430, a loop variable N may be set to 1. The operations shown in blocks 435, 440, 445, and 450 may then be performed for each semi-transparent surface. As shown in block 435, the stencil buffer 160 may be cleared (e.g., by setting all values to zero), the Z-values in the Z-buffer 150 may be set to Z-near, and the Z-test 130 may be disabled. As shown in block 440, the current (Nth) semi-transparent surface may be rendered to the multi-sampling image buffer 180 and Z-buffer 150. Rendering the surface may comprise rasterizing one or more objects and/or executing a pixel shader and/or vertex shader to generate the multi-samples in the image buffer 180.

In one embodiment, a stencil test 140 may be used in block 440 to obtain a given surface. A stencil reference value of N−1 may be set for each corresponding pixel in the stencil buffer 160. The appropriate stencil values in the stencil buffer 160 may be incremented for each surface encountered during a pass through the geometry such that the stencil buffer 160 indicates the number of surfaces drawn at any given pixel. If the stencil test determines that the current value of the stencil for the pixel equals the stencil reference value, then the Z-value may be written to the Z-buffer. Therefore, during the Nth iteration, only the Nth surface in draw order may be written to the Z-buffer.

As shown in block 445, for each surface closer than the Z-value in the Z-buffer 445, the multi-sample color values may be multiplied by the transparency values of the occluding surface. The Z-test 130 may be enabled to identify closer surfaces in the operation shown in block 445. In one embodiment, opaque objects are considered to have a transparency of zero. In one embodiment, each color channel (e.g., each of the red, blue, and green values for the pixel) may have a different transparency value. As shown in block 450, the multi-samples for each pixel may be averaged and added to the total color buffer 450 at the display resolution.

As shown in block 455, the loop variable N may be incremented. As shown in block 460, it may be determined whether zero pixels were written to the image buffer 180 in block 440. The operation shown in block 440 may be evaluated using an occlusion test that returns an integer count of pixels plotted during this iteration. If zero pixels were written, then the rendering ends, and the total color buffer 170 may be used to generate the final output for display. If, however, any pixels were written in block 440, then control returns to block 435 for processing of the next semi-transparent surface in draw order. In one embodiment, the operations shown in blocks 435 through 455 may be repeated as many times as the maximum number of surfaces overlapping any given pixel in the frame.

Figure 5:
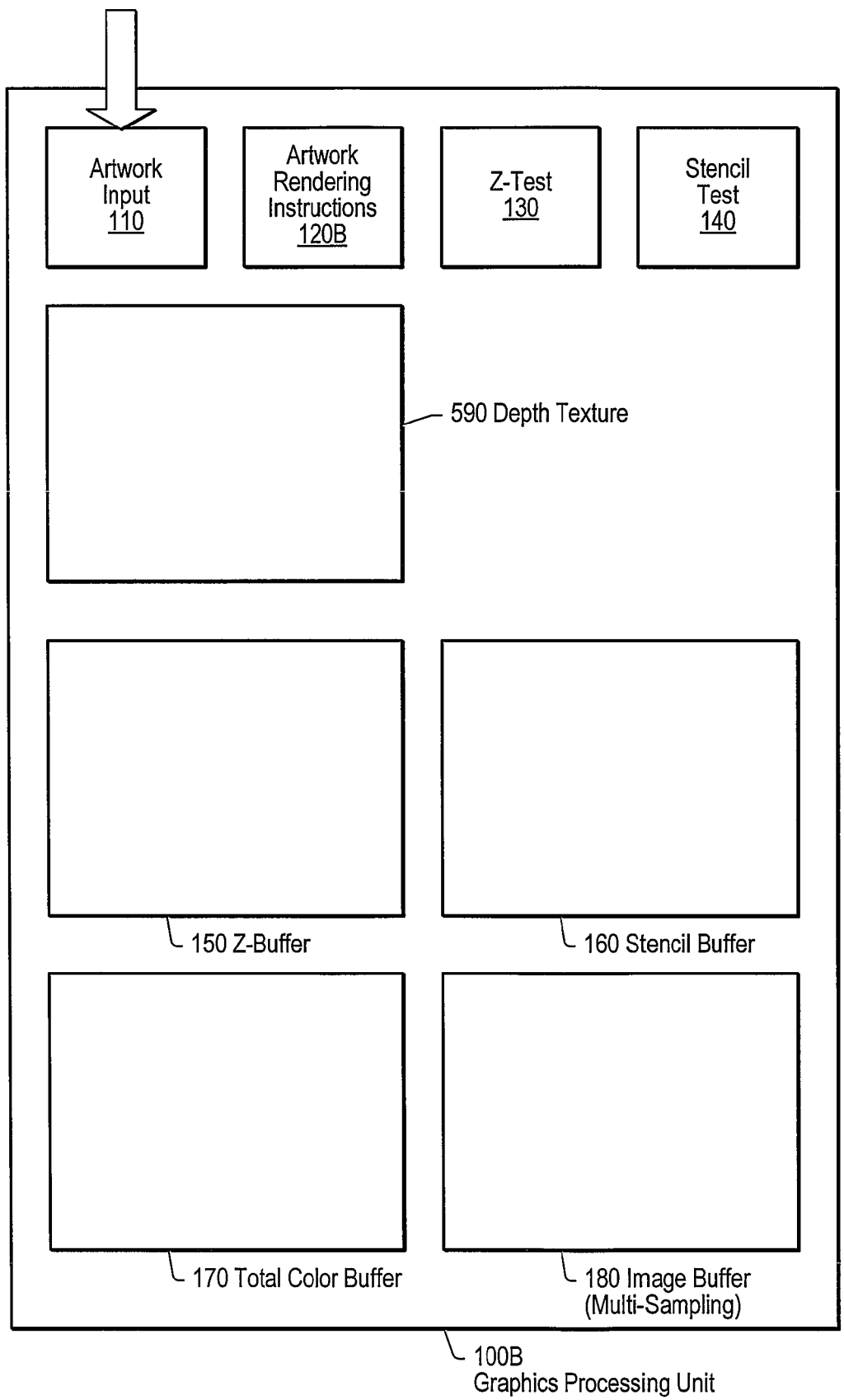
FIG. 5 is a block diagram illustrating one embodiment of a GPU configured for rendering artwork including semi-transparent surfaces using multi-sampling hardware for a plurality of surfaces at once.

FIG. 5 is a block diagram illustrating one embodiment of a GPU 100B configured for rendering artwork including semi-transparent surfaces using multi-sampling hardware for a plurality of surfaces at once. The GPU 100B shown in FIG. 5 may share elements and functions with the GPU 100A shown in FIG. 1. As will be described below, the GPU 100B may store artwork rendering instructions 120B for rendering artwork including semi-transparent surfaces by using multi-sampling hardware to represent a plurality of surfaces in the same multi-sampling image buffer 180. In one embodiment, the multi-sampling image buffer 180 may store S semi-transparent surfaces at any given time (e.g., S consecutive semi-transparent surfaces in the draw order), where S is the number of available multi-samples per pixel (e.g., up to 16 in some modern GPUs). The size of the multi-sampling image buffer 180 may be increased to process more surfaces for each pass through the artwork geometry. The multi-samples in the image buffer 180 may be indexed by surface number. In this manner, the speed of rendering artwork may be increased by forgoing anti-aliasing or reducing the resources (e.g., multi-samples) devoted to anti-aliasing. In one embodiment, the shading and geometry overhead of the rendering process may be cut by approximately S/2 compared to layer peeling by using the techniques shown below in FIGS. 6 and 7.

Figure 6:
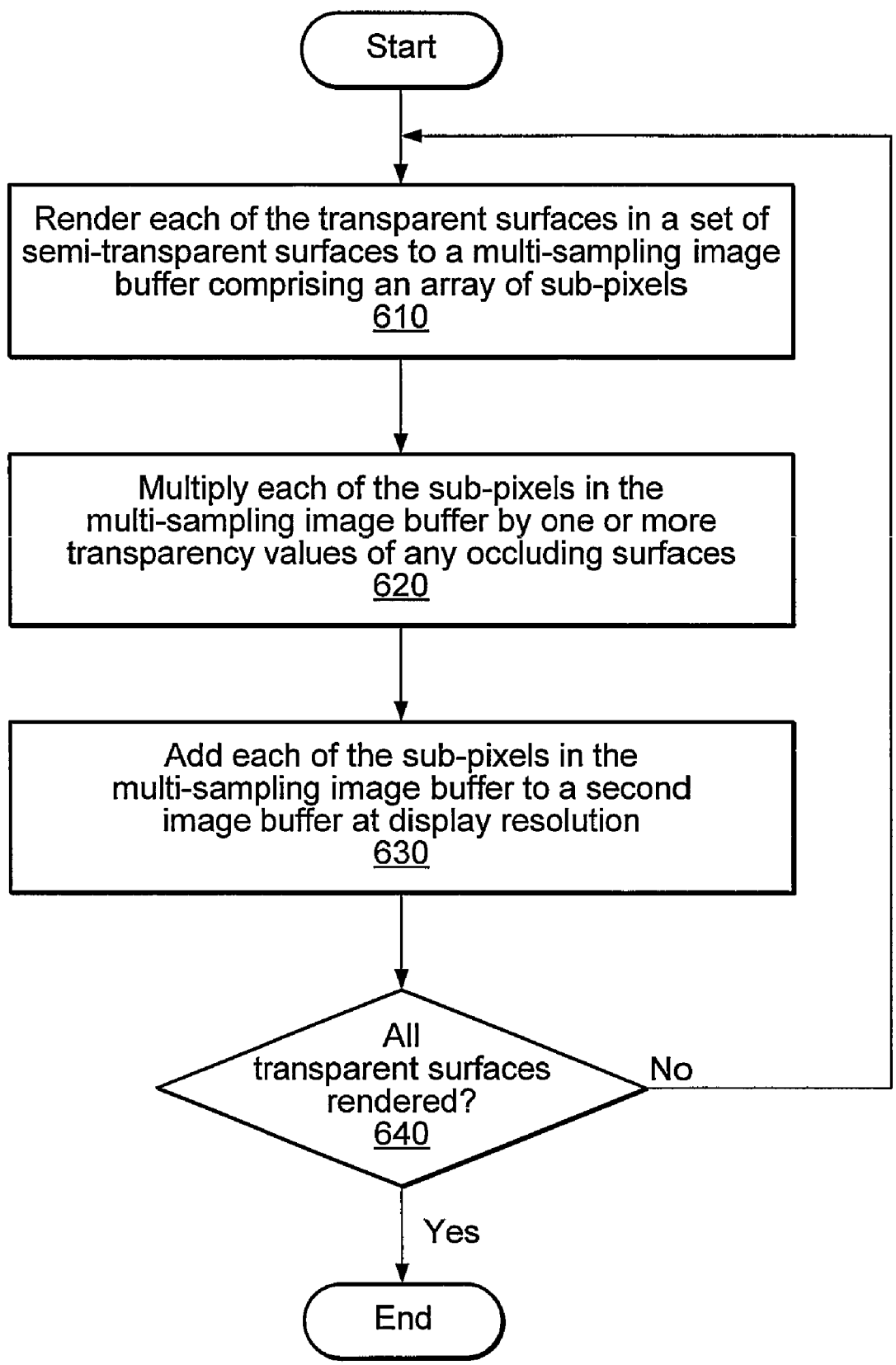
FIG. 6 is a flow diagram illustrating a method for rendering artwork including semi-transparent surfaces by using multi-sampling hardware for a plurality of surfaces at once according to one embodiment.
Figure 7:
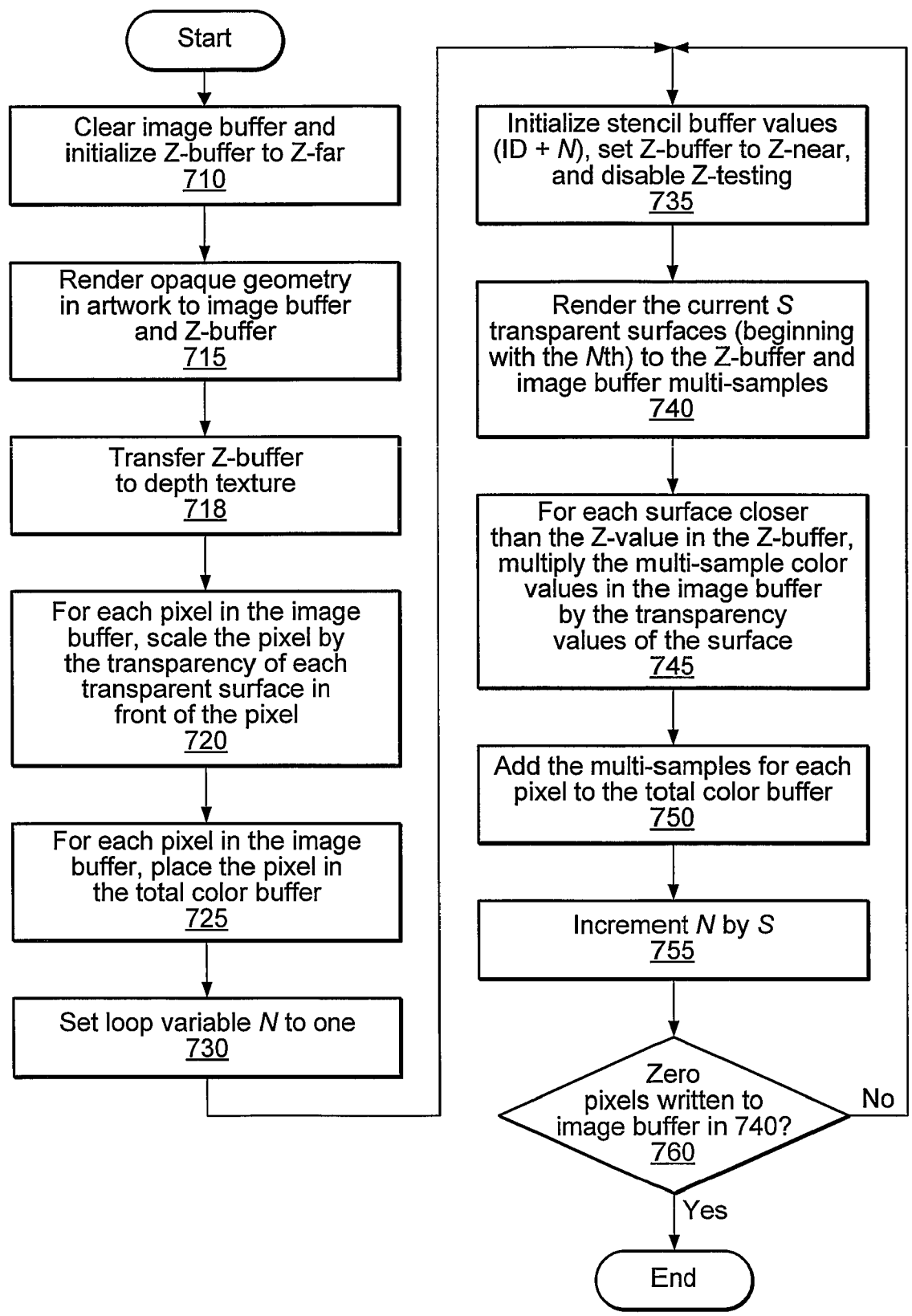
FIG. 7 is a flow diagram illustrating a method for rendering artwork including semi-transparent surfaces by using multi-sampling hardware for a plurality of surfaces at once according to one embodiment.

The rendering techniques shown in FIGS. 6 and 7 may be referred to as Simultaneous Occluding Transparency (SOT) techniques. FIG. 6 is a flow diagram illustrating a method for rendering artwork including semi-transparent surfaces by using multi-sampling hardware to represent a plurality of surfaces in the same image buffer according to one embodiment. Blocks 610 through 630 may be performed for each set of semi-transparent surfaces in an artwork. The semi-transparent surfaces may be unsorted and processed in draw order. Opaque surfaces in the artwork, if any, may be processed beforehand as described with reference to FIG. 7.

As shown in block 610, each of the semi-transparent surfaces in the set of semi-transparent surfaces may be rendered to a multi-sampling image buffer 180 comprising an array of sub-pixels. The multi-sampled image buffer 180 may comprise a fixed multiple (e.g., four, eight, sixteen, etc.) of sub-pixels for each destination pixel in the artwork. Each sub-pixel in the array may be indexed to a corresponding one of the semi-transparent surfaces in the current set. In one embodiment, corresponding sub-pixels in the stencil buffer 160 may be assigned different stencil values corresponding to different surfaces in the set. Therefore, each sub-pixel in the array of sub-pixels may be indexed to a corresponding one of the semi-transparent surfaces by the stencil value of the corresponding sub-pixel in the stencil buffer.

In one embodiment, the position of the sub-pixel within a pixel may be set to be the center of the pixel or another fixed relative position. The position may be the same for all sub-pixels. In one embodiment, the position of the sub-pixels may be specified using a graphics API implemented by the GPU 100B. Each sub-pixel in the image buffer 180 may have its own color and alpha values plus a corresponding Z-value in the Z-buffer 150 and a corresponding stencil value in the stencil buffer 160.

In one embodiment, each of a plurality of GPUs may be configured to render at least one of the semi-transparent surfaces in each set of semi-transparent surfaces to the multi-sampling image buffer. In one embodiment, an anti-aliasing feature of the GPU may be disabled prior to the operation shown in block 610. In one embodiment, the operation shown in block 610 may instead be combined with the anti-aliasing feature as will be described in greater detail with respect to FIGS. 8A, 8B, and 8C.

As shown in block 620, each of the sub-pixels in the multi-sampling image buffer may be multiplied by one or more transparency values of one or more surfaces (if any) that occlude the respective sub-pixel in the corresponding semi-transparent surface. An occluding surface may comprise a surface that is between another surface and the viewpoint 212. In other words, the surface color of each sub-pixel in the rendered semi-transparent surfaces may be attenuated by the product of the transparency values of any surfaces nearer to the viewpoint. In one embodiment, the operations performed in blocks 610 and 620 may be represented by equation (4) shown above.

As shown in block 630, each of the sub-pixels in the multi-sampling image buffer may be added to a second image buffer. The second image buffer (e.g., the total color buffer 170) may comprise an array of pixels at a display resolution. In one embodiment, the sub-pixels may be added to the second image buffer by averaging color and transparency values for corresponding sets of the sub-pixels to generate color and transparency values for each pixel in the second image buffer.

As shown in block 640, the method may continue at block 610 for the next set of semi-transparent surfaces in draw order until all of the semi-transparent surfaces have been processed. After processing all the surfaces in the artwork, the total color buffer 170 may be used to generate the final output for display. The final pixel values may be represented by equation (5) shown above.

FIG. 7 is a flow diagram illustrating further aspects of a method for rendering artwork including semi-transparent surfaces by using multi-sampling hardware to represent a plurality of surfaces in the same image buffer according to one embodiment. As shown in block 710, the image buffer 180 may be cleared, and the Z-buffer may be initialized so that all values are Z-far.

In one embodiment, multi-samples may be used to represent multiple layers with samples for a pixel at the same spatial position (i.e., aligned samples). In this embodiment, the opaque geometry may be processed as shown in blocks 715, 718, 720, and 725 prior to processing the semi-transparent surfaces. In another embodiment, sub-pixels are at multiple locations and at each location may represent multiple layer values (i.e., non-aligned samples). In the non-aligned case, the opaque surfaces may be processed at the same time as the semi-transparent surfaces (e.g., by assigning the opaque surfaces a transparency of zero). Therefore, blocks 715, 718, 720, and 725 may be optional.

As shown in block 715, any opaque surfaces in the artwork may be rendered to a single-sampling image buffer and the Z-buffer 150. After rendering the opaque geometry, the Z-buffer 150 may be copied to a depth texture 590 or swapped with the depth texture 590. The depth texture 590 may match the display resolution and may be used to cull semi-transparent fragments behind opaque surfaces before they are submitted for rendering to the image buffer. In one embodiment, a pointer on the GPU may be updated so that the depth texture 590 is written to instead of the Z-buffer 150. As shown in block 720, each pixel in the image buffer 180 may be scaled by the transparency of each transparent surface (if any) nearer than the pixel. As shown in block 725, each pixel in the image buffer 180 may be added to the total color buffer 170.

In one embodiment, the semi-transparent surfaces (and the opaque surfaces, if not previously rendered) may then be processed in draw order. As shown in block 730, a loop variable N may be set to 1. The operations shown in blocks 735, 740, 745, and 750 may then be performed for each semi-transparent surface. As shown in block 735, the Z-values in the Z-buffer 150 may be set to Z-near, and the Z-test 130 may be disabled. The stencil values in the stencil buffer 160 corresponding to each of the multi-samples may be set to ID+N, where ID is an index of the multi-samples that ranges from 1 to S. Therefore, each multi-sample within a destination pixel may have a different stencil value corresponding to a different surface in the draw order. In one embodiment, the stencil values may be set using a graphics API implemented by the GPU 100B.

As shown in block 740, the current S semi-transparent surfaces (e.g., the Nth surface through the [N+S−1]th surface) may be rendered to the multi-sampling image buffer 180 and Z-buffer 150. The rendering may also include testing the multi-sample stencil value for equality with one (using a stencil test 140 as discussed above) and then decrementing the stencil. The decrement may be done to include clamping the result to a value of zero to prevent the values wrapping round to a maximum value (e.g., 255). Rendering the surface may comprise rasterizing one or more objects and/or executing a pixel shader and/or vertex shader to generate the multi-samples in the image buffer 180.

As shown in block 745, for each semi-transparent surface closer than the Z-values in the Z-buffer 745, the multi-sample color values may be multiplied by the transparency values of the occluding surface. The Z-test 130 may be enabled to identify closer surfaces in the operation shown in block 745. In one embodiment, each color channel (e.g., each of the red, blue, and green values for the pixel) may have a different transparency value.

As shown in block 750, the multi-samples at each pixel may be added to the total color buffer 750 at the display resolution. For the aligned-sample case, samples in the passes through the semi-transparent geometry may be added together and added to the total color buffer. For the non-aligned case, the samples may be added together and then divided by the number of spatial locations per pixel.

As shown in block 755, the loop variable N may be incremented by the value of S. Alternatively, if the stencil values are instead set to ID+N*S in block 735, where S is the number of multi-samples per pixel, then the loop variable N may be incremented by one. As shown in block 760, it may be determined whether zero pixels were written to the image buffer 180 in block 740. The operation shown in block 740 may be evaluated using an occlusion test that returns an integer count of pixels plotted during this iteration. If zero pixels were written, then the rendering ends, and the total color buffer 170 may be used to generate the final output for display. If, however, any pixels were written in block 740, then control returns to block 735 for processing of the next semi-transparent surface in draw order.

In one embodiment, aspects of the methods shown in FIGS. 3, 4, 6, and 7 may be combined such that multi-samples are used for both anti-aliasing and faster processing of semi-transparent surfaces. To implement this hybrid technique, multi-samples may be configured with a portion of the samples devoted to anti-aliasing (as shown in FIGS. 3 and 4) and another portion devoted to storing pixels from different surfaces (as shown in FIGS. 6 and 7). For example, if the multi-sample image buffer 180 is allocated with 16 times the resolution of a final display, then the 16×value may be divided in various ways such as 2 spatial samples per destination pixel (and 8 surfaces processed per pass), 4 spatial samples per destination pixel (and 4 surfaces processed per pass), or 8 spatial samples per destination pixel (and 2 surfaces processed per pass).

Figure 8A:
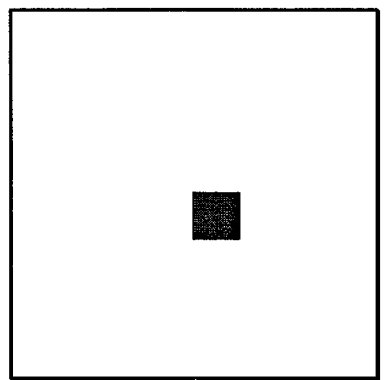
FIGS. 8A, 8B, and 8C illustrate multi-sample configurations usable for rendering artwork including semi-transparent surfaces according to one embodiment.
Figure 8B:
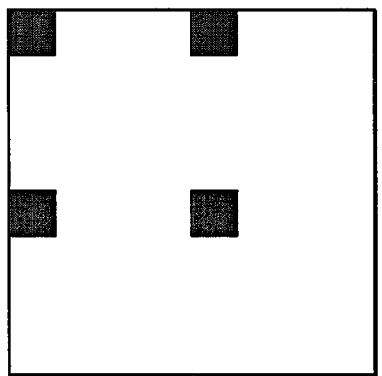
Figure 8C:
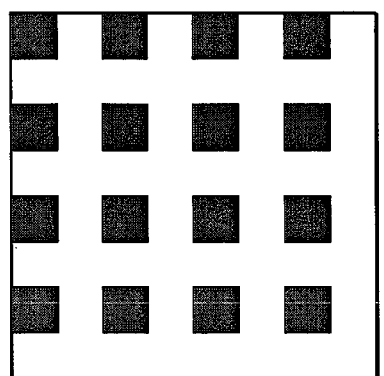

Multi-samples within a given cluster may have the same spatial position but may be initialized with different stencil values. Given a finite number of multi-samples per pixel, the clusters may be configured spatially in a plurality of ways. FIG. 8A illustrates an example of a multi-sample configuration 810 according to one embodiment. The multi-sample configuration 810 may include C samples in a single cluster. FIG. 8B illustrates an example of a multi-sample configuration 820 according to one embodiment. The multi-sample configuration 820 may include C/4 samples in four clusters. FIG. 8C illustrates an example of a multi-sample configuration 830 according to one embodiment. The multi-sample configuration 830 may include C/16 samples in 16 clusters.

In one embodiment, the cluster configuration (e.g., the number of clusters per pixel) may be set globally for all pixels. In one embodiment, the cluster configuration may be set independently for each pixel. The cluster configuration may be based on a desired trade-off between reducing the number of passes for highly complex sets of surfaces versus better spatial anti-aliasing.

In one embodiment, a worst case depth complexity for semi-transparent surfaces may be determined as follows. First, the Z-buffer may be initialized to Z-far. Second, the opaque geometry may be rendered to the Z-buffer. Third, the semi-transparent geometry may be rendered (e.g., in a single pass through the geometry) into a stencil or color buffer in such a way as to count the number of surfaces in front of each sub-pixel Z-value. Fourth, the maximum value may be found for the number of nearer surfaces among the multi-samples of a given pixel. Finally, the maximum depth complexity may be used to set the cluster choice for the pixel. A clustering pattern may be chosen that could handle all of the nearer surfaces in a single pass of the geometry but that has the largest number of clusters per pixel (e.g., to maximize anti-aliasing quality). In one embodiment, the spatial locations for clusters in pixels with fewer clusters may use a sub-set of spatial positions present in the pixel scheme with one cluster per multi-sample.

When used with a computer system having a plurality of GPUs (e.g., G GPUs), the layer peeling technique still typically requires the same number of passes (e.g., M passes) through the geometry because the technique is not order-independent. For rasterization in layer peeling, the image may be tiled to make use of the plurality of GPUs.

Using an SOT technique as shown in FIGS. 6 and 7, work may be split across different GPUs by tiling the image into G parts, leading to (M/S+1)*2 geometry passes and G times more efficient rasterization. In one embodiment, the SOT technique may be split with the whole image being given to each GPU, but assigning a different starting value for N in place of block 730 (e.g., use S*IG, where IG is the index of the GPU starting at zero) and incrementing N with S*G in place of block 755. This multi-GPU SOT technique may use ((M/(S*G)+1)*2) passes through the geometry. For example, a computer system having four GPUs with 16 samples per pixel could render up to 64 layers using just two geometry passes on each GPU.

In various embodiments, the elements shown in FIGS. 3, 4, 6, and 7 may be performed in a different order than the illustrated order. In FIGS. 3, 4, 6, and 7, any of the operations described in the elements may be performed programmatically (i.e., by a computer according to a computer program). In FIGS. 3, 4, 6, and 7, any of the operations described in the elements may be performed automatically (i.e., without user intervention).

FIG. 9 is a block diagram illustrating constituent elements of a computer system 1000 that is configured to implement embodiments of the system and method for rendering artwork including semi-transparent surfaces. The computer system 1000 may include one or more processors 1010 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1000, such as various versions of Unix, Linux, Windows™ from Microsoft Corporation, MacOS™ from Apple Corporation, or any other operating system that enables the operation of software on a hardware platform. The processor(s) 1010 may be coupled to one or more of the other illustrated components, such as a memory 1020, by at least one communications bus.

In one embodiment, a GPU 100 may be included in a specialized graphics card or other graphics component that is coupled to the processor(s) 1010. Additionally, the computer system 1000 may include one or more displays 1052. In one embodiment, the display(s) 1052 may be coupled to the GPU 100 for display of data provided by the GPU 100.

Program instructions 120 that may be executable by the processor(s) 1010 to implement aspects of the techniques described herein (e.g., for rendering artwork including semi-transparent surfaces) may be partly or fully resident within the memory 1020 at the computer system 1000 at any point in time. The program instructions 120 may include, for example, artwork rendering instructions 120A and/or 120B. As described above, the instructions 120 may also be provided to the GPU 100 for execution by the GPU 100. The memory 1020 may be implemented using any appropriate medium such as any of various types of ROM or RAM (e.g., DRAM, SDRAM, RDRAM, SRAM, etc.), or combinations thereof. The program instructions 120 may also be stored on a storage device 1060 accessible from the processor(s) 1010. Any of a variety of storage devices 1060 may be used to store the program instructions 1040 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1060 may be coupled to the processor(s) 1010 through one or more storage or I/O interfaces. In some embodiments, the program instructions 1040 may be provided to the computer system 1000 via any suitable computer-readable storage medium including the memory 1020 and storage devices 1060 described above.

The computer system 1000 may also include one or more additional I/O interfaces, such as interfaces for one or more user input devices 1050. In addition, the computer system 1000 may include one or more network interfaces 1054 providing access to a network. It should be noted that one or more components of the computer system 1000 may be located remotely and accessed via the network. The program instructions 120 may be implemented in various embodiments using any desired programming language, scripting language, or combination of programming languages and/or scripting languages, e.g., C, C++, C#, Java™, Perl, etc. It will be apparent to those having ordinary skill in the art that computer system 1000 can also include numerous elements not shown in FIG. 9, as illustrated by the ellipsis shown.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for rendering an artwork comprising a plurality of surfaces, wherein the plurality of surfaces comprises a plurality of semi-transparent surfaces, the method comprising, for each of the semi-transparent surfaces:
   rendering the semi-transparent surface to a first image buffer at a multi-sampled resolution;
   multiplying the rendered semi-transparent surface at the multi-sampled resolution by one or more transparency values of one or more of the plurality of surfaces nearer than the rendered semi-transparent surface;
   reducing the rendered semi-transparent surface from the multi-sampled resolution to a display resolution; and
   adding the rendered semi-transparent surface at the display resolution to a second image buffer;
   wherein, after a first one of the rendered semi-transparent surfaces is added to the second image buffer at the display resolution, said adding comprises modifying a current total in the second image buffer, wherein the current total in the second image buffer is based on one or more rendered semi-transparent surfaces previously added to the second image buffer at the display resolution;
   wherein at least one of the plurality of semi-transparent surfaces is rendered out of depth order with respect to the remaining ones of the plurality of semi-transparent surfaces.

2. The method as recited in claim 1, wherein at least one of the plurality of surfaces comprises a plurality of transparency values.

3. The method as recited in claim 2, wherein a first one of the plurality of transparency values indicates a transparency value of a first color channel, and wherein a second one of the plurality of transparency values indicates a transparency value of a second color channel.

4. The method as recited in claim 1, wherein reducing the rendered semi-transparent surface from the multi-sampled resolution to the display resolution comprises generating each pixel at the display resolution by averaging color values of a set of corresponding pixels at the multi-sampled resolution.

5. The method as recited in claim 1, wherein the plurality of surfaces comprises one or more opaque surfaces, the method further comprising:
   rendering the one or more opaque surfaces prior to rendering a first of the semi-transparent surfaces to the first image buffer.

6. The method as recited in claim 1, wherein the plurality of semi-transparent surfaces are unsorted relative to a depth order prior to rendering a first of the semi-transparent surfaces to the first image buffer.

7. The method as recited in claim 1, further comprising:
   using the second image buffer to generate a display on a display device.

8. A non-transitory, computer-readable storage medium, comprising program instructions for rendering an artwork comprising a plurality of surfaces, wherein the plurality of surfaces comprises a plurality of semi-transparent surfaces, wherein the program instructions are computer-executable to implement, for each of the semi-transparent surfaces:
   rendering the semi-transparent surface to a first image buffer at a multi-sampled resolution;
   multiplying the rendered semi-transparent surface at the multi-sampled resolution by one or more transparency values of one or more of the plurality of surfaces nearer than the rendered semi-transparent surface;
   reducing the rendered semi-transparent surface from the multi-sampled resolution to a display resolution; and
   adding the rendered semi-transparent surface at the display resolution to a second image buffer;
   wherein, after a first one of the rendered semi-transparent surfaces is added to the second image buffer at the display resolution, said adding comprises modifying a current total in the second image buffer, wherein the current total in the second image buffer is based on one or more rendered semi-transparent surfaces previously added to the second image buffer at the display resolution;
   wherein at least one of the plurality of semi-transparent surfaces is rendered out of depth order with respect to the remaining ones of the plurality of semi-transparent surfaces.

9. The non-transitory, computer-readable storage medium as recited in claim 8, wherein at least one of the plurality of surfaces comprises a plurality of transparency values.

10. The non-transitory, computer-readable storage medium as recited in claim 9, wherein a first one of the plurality of transparency values indicates a transparency value of a first color channel, and wherein a second one of the plurality of transparency values indicates a transparency value of a second color channel.

11. The non-transitory, computer-readable storage medium as recited in claim 8, wherein reducing the rendered semi-transparent surface from the multi-sampled resolution to the display resolution comprises generating each pixel at the display resolution by averaging color values of a set of corresponding pixels at the multi-sampled resolution.

12. The non-transitory, computer-readable storage medium as recited in claim 8, wherein the plurality of surfaces comprises one or more opaque surfaces, and wherein the program instructions are further computer-executable to implement:
   rendering the one or more opaque surfaces prior to rendering a first of the semi-transparent surfaces to the first image buffer.

13. The non-transitory, computer-readable storage medium as recited in claim 8, wherein the plurality of semi-transparent surfaces are unsorted relative to a depth order prior to rendering a first of the semi-transparent surfaces to the first image buffer.

14. The non-transitory, computer-readable storage medium as recited in claim 8, wherein the program instructions are further computer-executable to implement:
   using the second image buffer to generate a display on a display device.

15. A system, comprising:
   at least one processor; and
   a memory coupled to the at least one processor, wherein the memory comprises a first image buffer and a second image buffer, wherein the memory is configured to store an artwork comprising a plurality of surfaces, wherein the plurality of surfaces comprises a plurality of semi-transparent surfaces, and wherein the memory is configured to store program instructions executable for each of the semi-transparent surfaces by the at least one processor to:
  render the semi-transparent surface to the first image buffer at a multi-sampled resolution;
  multiply the rendered semi-transparent surface at the multi-sampled resolution by one or more transparency values of one or more of the plurality of surfaces nearer than the rendered semi-transparent surface;
  reduce the rendered semi-transparent surface from the multi-sampled resolution to a display resolution; and
  add the rendered semi-transparent surface at the display resolution to the second image buffer;
  wherein, after a first one of the rendered semi-transparent surfaces is added to the second image buffer at the display resolution, said adding comprises modifying a current total in the second image buffer, wherein the current total in the second image buffer is based on one or more rendered semi-transparent surfaces previously added to the second image buffer at the display resolution;
  wherein at least one of the plurality of semi-transparent surfaces is rendered out of depth order with respect to the remaining ones of the plurality of semi-transparent surfaces.

16. The system as recited in claim 15, wherein at least one of the plurality of surfaces comprises a plurality of transparency values.

17. The system as recited in claim 16, wherein a first one of the plurality of transparency values indicates a transparency value of a first color channel, and wherein a second one of the plurality of transparency values indicates a transparency value of a second color channel.

18. The system as recited in claim 15, wherein reducing the rendered semi-transparent surface from the multi-sampled resolution to the display resolution comprises generating each pixel at the display resolution by averaging color values of a set of corresponding pixels at the multi-sampled resolution.

19. The system as recited in claim 15, wherein the plurality of surfaces comprises one or more opaque surfaces, and wherein the program instructions are further executable by the at least one processor to:
  render the one or more opaque surfaces prior to rendering a first of the semi-transparent surfaces to the first image buffer.

20. The system as recited in claim 15, wherein the plurality of semi-transparent surfaces are unsorted relative to a depth order prior to rendering a first of the semi-transparent surfaces to the first image buffer.

21. The system as recited in claim 15, further comprising:
  a display device, wherein the display device is configured to display an image using contents of the second image buffer.

* * * * *